United States Patent
Moser

(10) Patent No.: US 9,326,109 B2
(45) Date of Patent: Apr. 26, 2016

(54) PRIORITIZED MESSAGE NOTIFICATION FOR MOBILE COMMUNICATION DEVICES

(71) Applicant: Martin Moser, Speyer (DE)

(72) Inventor: Martin Moser, Speyer (DE)

(73) Assignee: SAP SE, Walldorf (DE)

( * ) Notice: Subject to any disclaimer, the term of this patent is extended or adjusted under 35 U.S.C. 154(b) by 141 days.

(21) Appl. No.: 13/928,243

(22) Filed: Jun. 26, 2013

(65) Prior Publication Data

US 2015/0003334 A1 Jan. 1, 2015

(51) Int. Cl.
*H04W 4/00* (2009.01)
*H04W 4/12* (2009.01)
*H04L 12/58* (2006.01)
*H04M 3/00* (2006.01)
*H04W 4/16* (2009.01)
*H04L 29/08* (2006.01)

(52) U.S. Cl.
CPC ............. *H04W 4/12* (2013.01); *H04L 51/00* (2013.01); *H04M 3/00* (2013.01); *H04W 4/16* (2013.01); *H04L 67/322* (2013.01)

(58) Field of Classification Search
CPC ............................ H04W 68/00; H04W 68/005
USPC .................................................. 370/252, 329
See application file for complete search history.

(56) References Cited

U.S. PATENT DOCUMENTS

| | | | |
|---|---|---|---|
| 5,875,387 A * | 2/1999 | Ayerst | 340/7.42 |
| 6,249,808 B1 * | 6/2001 | Seshadri | 709/206 |
| 6,697,421 B1 * | 2/2004 | Monroe et al. | 375/222 |
| 7,099,865 B1 * | 8/2006 | Johansson et al. | |
| 8,032,118 B1 * | 10/2011 | Othmer et al. | 455/412.1 |
| 2002/0058502 A1 * | 5/2002 | Stanforth | 455/422 |
| 2002/0120705 A1 * | 8/2002 | Schiavone | H04L 12/585 709/207 |
| 2003/0058824 A1 * | 3/2003 | Petterson et al. | 370/338 |
| 2005/0208960 A1 * | 9/2005 | Hassan | 455/522 |
| 2007/0071024 A1 * | 3/2007 | Schentrup et al. | 370/443 |
| 2008/0037554 A1 * | 2/2008 | Vincent et al. | 370/395.42 |
| 2008/0097887 A1 * | 4/2008 | Duquette | G06Q 40/04 705/37 |
| 2009/0086953 A1 * | 4/2009 | Vendrow | 379/207.02 |
| 2010/0035594 A1 * | 2/2010 | Vendrow et al. | 455/417 |
| 2010/0261492 A1 * | 10/2010 | Salafia | H04M 11/04 455/466 |
| 2011/0151838 A1 * | 6/2011 | Olincy et al. | 455/412.1 |
| 2011/0281568 A1 * | 11/2011 | Le Clech | 455/415 |
| 2012/0076152 A1 * | 3/2012 | Mansharamani | 370/413 |
| 2014/0057610 A1 * | 2/2014 | Olincy et al. | 455/414.1 |
| 2014/0173000 A1 * | 6/2014 | Brown | H04L 51/24 709/206 |

* cited by examiner

*Primary Examiner* — Farah Faroul
(74) *Attorney, Agent, or Firm* — Mintz Levin Cohn Ferris Glovsky and Popeo, P.C.

(57) ABSTRACT

A mobile communication device can receive an inbound message, which can optionally be a voice call. Based on receipt or lack or receipt of an identifier data packet via a different communication layer than the inbound message or based on content of such an identifier data packet received in this manner, a level of prioritization can be recognized for the inbound message. A notification of the message can be provided based on the recognized level of prioritization. Methods, systems, articles of manufacture, and the like are described.

20 Claims, 3 Drawing Sheets

PRIORITIZED MESSAGE NOTIFICATION FOR MOBILE COMMUNICATION DEVICES

TECHNICAL FIELD

The subject matter described herein relates to approaches to notifying a mobile communication device user of a prioritized inbound message, such as for example a voice call, etc.

BACKGROUND

Users of mobile communication devices, such as for example cellular telephones, personal digital assistants, smart phones, tablet computers, and the like, are typically capable of receiving inbound messages in a wide range of locations and under a wide variety of personal circumstances. However, in at least some locations and under at least some circumstances, receipt of an inbound message can require the recipient to change his or her current behavior or location in order to receive the message in an appropriate manner. For example, if the inbound message is a voice call, and the recipient is in a meeting or in some other location or circumstance under which receiving a voice call is not appropriate, the recipient can be required to decide whether to reject or ignore the voice call (for example, by allowing it to be directed to the recipient's voice mail box) or to excuse himself or herself from the meeting in order to receive the call in a more appropriate location. Lacking any knowledge of the subject or content of the inbound message, the recipient is typically required to guess whether the inbound message merits the effort involved in changing location and/or circumstances to receive the inbound message directly instead of delaying receipt via a voice mail box or the like.

While a recipient of an inbound message may be able to make a basic determination about the priority of the inbound message, for example based on the caller or sender of the inbound message, the time of day, etc., such information generally cannot be used to distinguish with sufficient specificity between possible levels of prioritization of the inbound message. For example, even if an inbound voice call is indicated by the mobile communication device as originating from the recipient's spouse's device, the recipient typically has no way of knowing whether or not the inbound message is urgent and requiring of immediate attention from the recipient (e.g., if an accident has occurred, an important opportunity has come up, etc.), or if his or her spouse is calling about a relatively low urgency matter (e.g., meal plans, an invitation received from friends to attend a sporting event or a movie, etc.) that the recipient can safely address with some delay if the recipients current location or circumstances make receiving a voice call difficult or inappropriate.

SUMMARY

Consistent with some implementations of the current subject matter, a mobile communication device can receive an indication that accompanies or that is otherwise received substantially concurrently with or even slightly prior to the inbound message. The indication, which can take one or more of several forms, can include a message or other signal that the mobile device interprets to be indicative of an elevated priority associated with the inbound message. The mobile device can then present the inbound message to a user in a manner than conveys the elevated priority associated with the inbound message.

In one aspect, a method includes a mobile communication device receiving an inbound message via a first communication layer and determining whether an identifier data packet associated with the inbound message has been received via a second communication layer that differs from the first communication layer. The identifier data packet includes information about a priority level associated with content of the inbound message. The method can also include recognizing a level of elevated prioritization associated with the inbound message based on the determining, and providing a notification of the inbound message based at least in part on the recognized level of elevated prioritization and optionally on one or more notification handling parameters defined for the mobile communication device.

In some variations one or more of the following features can optionally be included in any feasible combination. For example, the inbound message can include a voice call. The identifier data packet can include information about a priority level associated with content of the inbound message. The first communication layer can include a voice channel of the mobile communication device. The second communication layer can include at least one of an SMS layer, a data link layer, and a data communication protocol layer used by the mobile communication device. The identifier data packet can include an indication that the inbound message has the associated level of prioritization, and the associated level of prioritization can be selected from a plurality of levels of prioritization. Receipt of the identifier data packet can indicate that the inbound message has an elevated level of prioritization and lack of receipt of the identifier data packet can indicate that the inbound message does not have an elevated level of prioritization.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Implementations of the current subject matter can include one or more methods, systems, articles of manufacture, and the like that supported identification by a mobile device of a prioritized inbound message. In non-limiting implementations, the inbound message is an inbound voice call. A "voice call" as used in the following description will be understood to include any of a telephone call, a voice over internet protocol (VOIP) call, a video call (e.g. a video call made using a service such as Skype™ offered by Skype Communications SARL of Luxembourg; FaceTime™ offered by Apple Computer Inc. of Cupertino, Calif.; Google Talk™ or Google+ Hangouts™ offered by Google Inc. of Mountain View, Calif.; etc.), or the like. The following descriptions of illustrative features are discussed in reference to a voice call. However, it will be understood that, unless otherwise unfeasible for some reason, the approaches discussed can also be applied to other types of inbound messages, such as for example inbound short message service (SMS) messages (e.g. text messages), e-mail messages, multimedia message service (MMS) messages, or the like.

Figure 1:
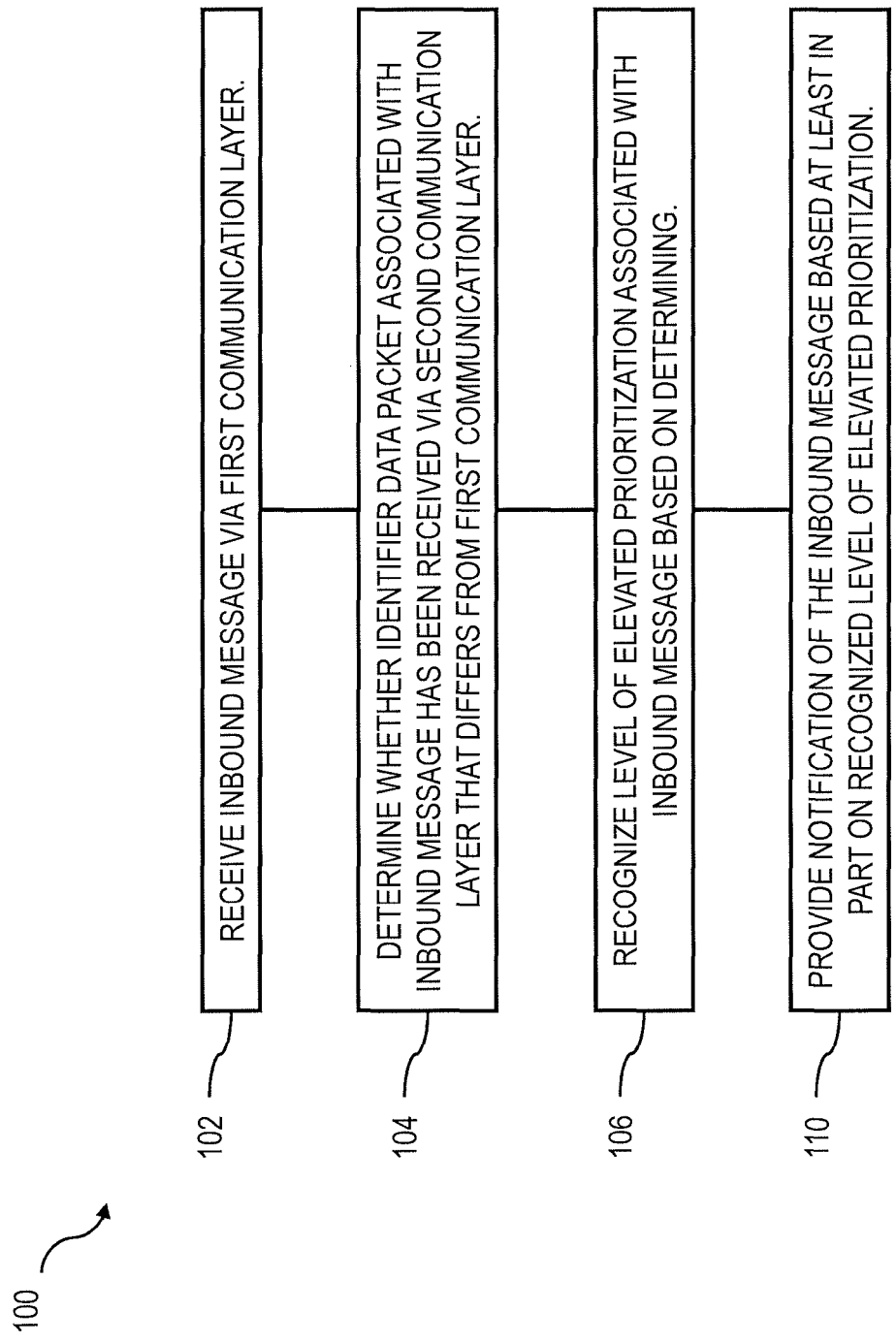
FIG. 1 shows a process flow diagram illustrating aspects of a method having one or more features consistent with implementations of the current subject matter.

FIG. 1 shows a process flow chart 100 illustrating method features that can be present in one or more implementations of the current subject matter, for example for receiving a prioritized in in bound message. At 102, a mobile communication device receives an inbound message to the mobile communication device using a first communication layer. In an example in which the inbound message is a voice call, the first communication layer can be the voice channel of the mobile communication device.

At 104, the mobile communication device determines whether an identifier data packet associated with the inbound message has been received via a second communication layer. The second communication layer differs from the first communication layer. The identifier data packet includes information about the priority of the inbound message. For example, the identifier data packet can include an indication that the inbound message is either urgent or not urgent. This indication can be as simple as a single bit, which is "on" to indicate an urgent inbound message and "off" to indicate a non-urgent message (or vice versa). In other examples, receipt or non-receipt of an identifier data packet can respectively indicate that the inbound message has an elevated priority or should be treated as a normal inbound message.

As discussed in more detail below, the second communication layer can in some examples include one or more of a SMS (text messaging) layer, a data link layer, a settable bit or other data unit or packet delivered as part of a data communication protocol layer used by the mobile communication device, or the like. The communication protocol can optionally be the Global System for Mobile Communications or GSM protocol, one of various standards used by code division multiple access (CDMA) mobile device networks, or the like.

Referring back to FIG. 1, at 106, the mobile communication device recognizes a level of prioritization associated with the inbound message based on the determining at 104. In examples in which receipt of an identifier data packet via a second communication layer indicates that the inbound message has elevated priority and absence of receipt of an identifier data packet via the second communication layer indicates that the inbound message does not have elevated priority, the recognizing of the level of prioritization associated with the inbound message can include a binary inquiry. In other examples, a received identifier data packet can include additional information that can inform a more detailed inquiry as part of the recognizing of the level of prioritization associated with the inbound message. For example, a finer level of granularity can be achieved based on additional data content in the identifier data packet. More than two levels (e.g. prioritized or not prioritized) of prioritization can be supported in this manner. In the case of more than two levels of prioritization that can be associated with an inbound message, a user can optionally define a threshold level of prioritization that must be associated with an inbound message for the inbound message to be recognized as having an elevated level of prioritization.

At 110, the mobile communication device provides a notification of the inbound message based at least in part on the recognized level of prioritization and optionally on one or more notification handling parameters defined for the mobile communication device. As examples, a prioritized inbound message can be delivered with a visible, audible, tactile (e.g. vibration of the mobile communication device or the like) or other indication that the inbound message has an elevated prioritization associated with it. A non-prioritized inbound message can be delivered without such an indication. Alternatively, only those messages with an elevated level of prioritization can be delivered at all. In the case of the inbound message being a voice call, for example, a non-prioritized inbound message can be sent directly to a voice mailbox rather than alerting the user of the mobile communication device at all regarding the existence of the inbound message.

Figure 2:
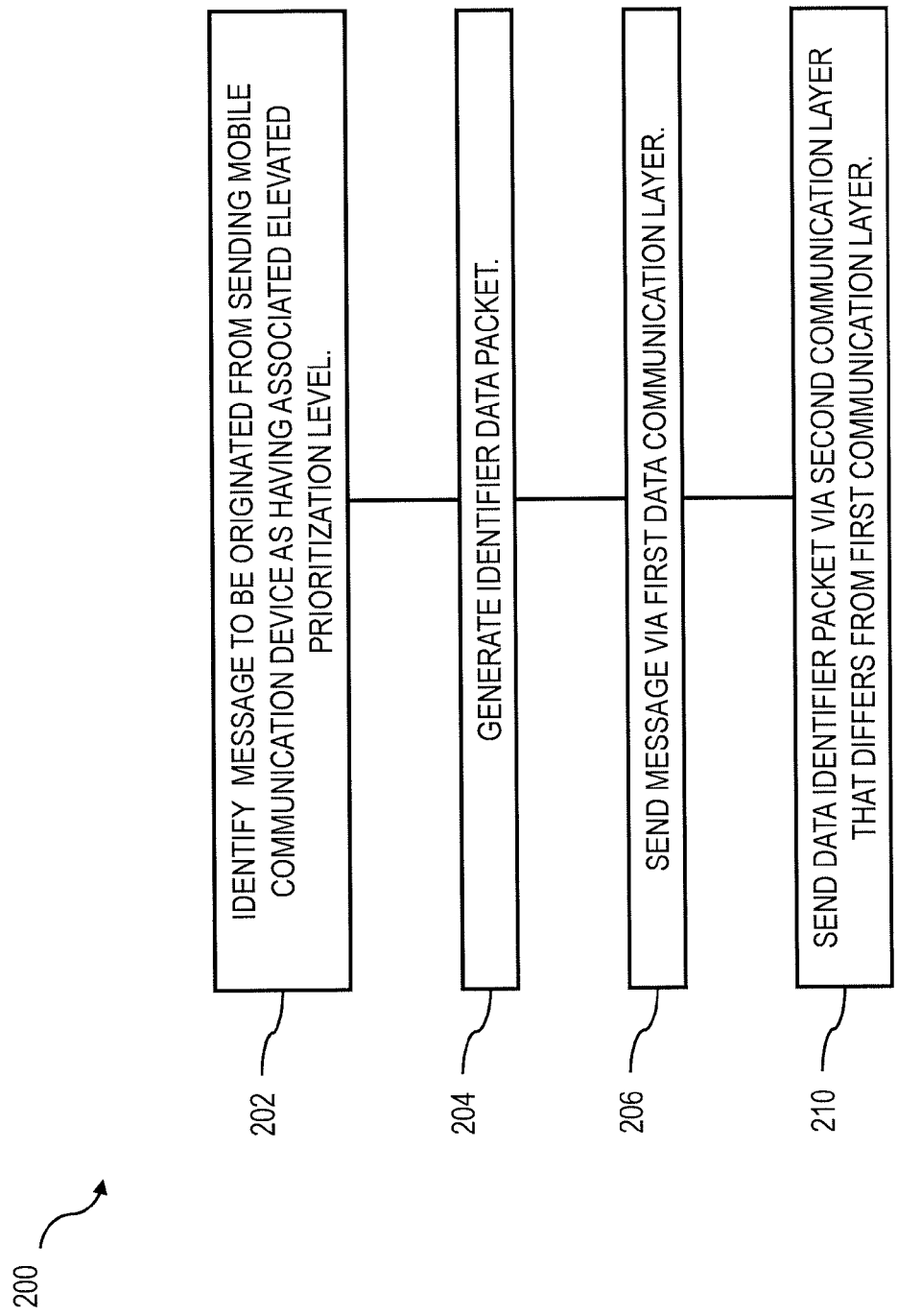
FIG. 2 shows another process flow diagram illustrating aspects of a method having one or more features consistent with implementations of the current subject matter.

FIG. 2 shows a process flow chart 200 illustrating method features that can be present in one or more implementations of the current subject matter, for example in association with sending a prioritized message. At 202, a message to be originated from a sending mobile communication device is identified as having an associated elevated prioritization level. At 204, an identifier data packet is generated, and at 206 and 210, the message and the identifier data packet are sent, via a first data communication layer and a second data communication layer, respectively for receipt by a receiving mobile communication device. The identifying of the elevated prioritization level associated with the message can be made in one or more ways. For example, a prioritized messaging application on the sending mobile communication device can always send messages with a data identifier packet. A user can use the prioritized messaging application whenever he or she wishes to send a prioritized message (e.g. originate a prioritized voice call) to a receiver mobile communication device.

Figure 3:
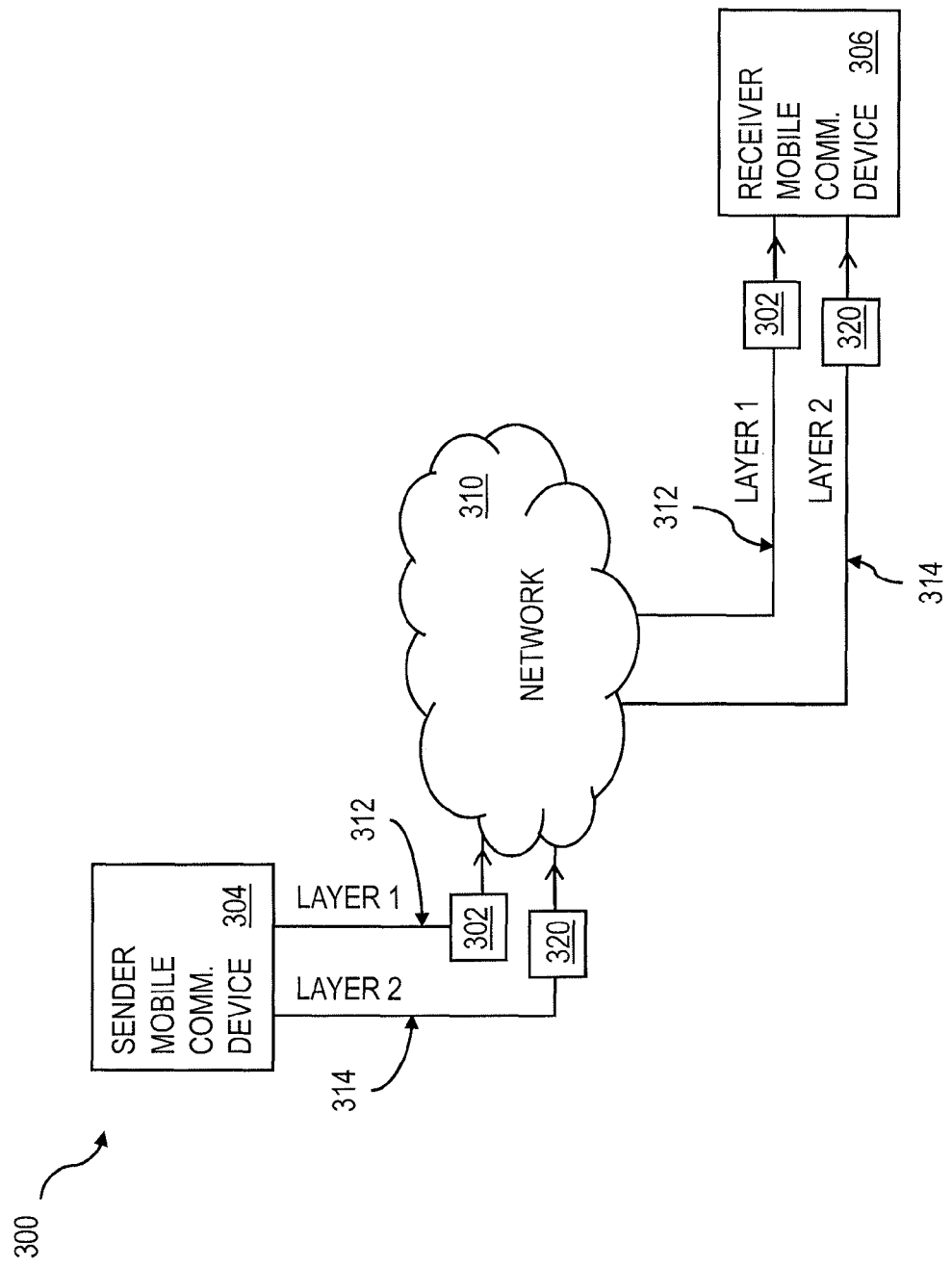
FIG. 3 shows a diagram illustrating aspects of a communications framework showing features consistent with implementations of the current subject matter.

As shown in the framework diagram 300 of FIG. 3, implementations of the current subject matter can include exchange of an inbound message 302 originating from a sender mobile communication device 304 and delivered to a receiver mobile communication device 306 over a network 310. A first communication layer 312 can be used in sending and receiving the inbound message 302. A second communication layer 314 can be used in sending (by the sender mobile communication device 304) and receiving (by the receiver mobile communication device 306) an identifier data packet 320 that can have one or more features as discussed elsewhere herein. Each of the sender mobile communication device 304 and the receiver mobile communication device 306 can include hardware such as at least one programmable processor, a communication transceiver, a display screen, one or more user input features (e.g. a physical or soft keyboard, a touch screen, one or more soft or physical buttons, etc.), and the like.

The receiver mobile communication device 306 can support user configuration capabilities that allow a user to determine the actions to be taken for inbound messages with an associated elevated level of prioritization, for those inbound message with no elevated level of prioritization, etc.

In some implementations of the current subject matter, a receiver mobile communication device 306 can execute an application (e.g., software-based functionality, etc.) that recognizes the level of prioritization associated with the inbound message based on the received identifier data packet and that determines the type of notification to be provided. In some implementations, the application can also serve as an originator for sending of a message from the receiver mobile communication device to another mobile communication device. In other words, the receiver mobile communication device 306 can also act as a sender mobile communication device 304. As a non-limiting example, a user can initiate such an application or activate a feature or function within the application already running on the receiver mobile communication device 306 that causes the receiver mobile communication device 306 to filter inbound messages by associated levels of priority, such as is described above.

Major mobile communication device platforms, such as for example iOS™ available from Apple Computer Inc., Android™ available from Google Inc.; Windows Phone™ available from Microsoft Corp. of Redmond, Wash.; and the like, typically provide application programming interfaces (APIs) that allow mobile device applications (e.g. "apps") to initiate and receive voice calls, and also to send a data message, such as a SMS message, an e-mail, or the like.

Consistent with implementations of the current subject matter, a sender application at a sender mobile communication device 304 can implement prioritized outbound messaging as follows. For an outgoing voice call, the sender application can generate both an SMS and a voice call addressed to the message recipient. The SMS can be sent in a "silent" mode, meaning that the receiver mobile communication device 306 does not provide a notification or other display to a user of the receiver mobile communication device 306 upon receipt of the SMS. The receiver mobile communication device 306 also need not store the SMS. However, a receiver application at the receiver mobile communication device 306 can react to receipt of both the silent SMS and the voice call. Whenever both the SMS and the voice call are received, the voice call can be recognized as "prioritized" and the receiver application can cause the receiver mobile communication device 306 to provide a notification of the inbound call. A voice call received by the receiver mobile communication device 306 without the accompanying silent SMS would not be recognized as prioritized by the receiver application. The receive application can optionally be a same application as the application on the sender mobile communication device 304. Alternatively, the receiver application can be a different application than the sender application.

Alternatively, the accompanying silent SMS can include one or more items of data content. In an example, the silent SMS can include a designation of one of two or more levels of prioritization, and the app at the receiver mobile communication device 306 can assign one of a plurality of notification options to the inbound message 302 based at least in part on the designated level of the two or more levels of prioritization. For example, the two or more levels of prioritization can include a lowest level or prioritization, a highest level of prioritization, and at least one intermediate level of prioritization.

The receiver application can include one or more parameter setting features, such as for example a "settings" screen to allow the user to define how prioritized inbound messages are treated. In other implementations of the current subject matter, the treatment of inbound messages 302 according to the recognized level of prioritization can be predetermined. In such an example, the receiver application can behave as discussed above, but can optionally include an ability for the user to turn the prioritization recognition and notification features off and on depending on location and current circumstances of the receiver mobile communication device 306. In other examples, the receiver application can perform the prioritization recognition and notification features only if it is active, only it is running (optionally either as a background application or as a currently active application), or the like.

In other implementations of the current subject matter, features of a mobile communication device network protocol (e.g. GSM, CDMA, or the like) can be sued as the second communication layer discussed above. As an example, the GSM protocol generally initiates a voice call to a mobile communication device via an alerting message. As discussed, in the *European Telecommunications Standard*, ETS 300 557, "Digital cellular telecommunications system (Phase 2): Mobile radio interface, Layer 3 specification, (GSM 04.08 version 4.23.1)," 12th Edition, October, 1999, which is incorporated herein by reference (see e.g. section 9.3.1) the alerting message can include an information element labeled "user-user" generally containing user-defined data (e.g. data evaluated and used by the mobile communication device provider). This field can be used to carry one or more additional bits that can comprise the identifier data packet discussed above. For example, the one or more additional bits can provide an indication of a level of prioritization to be associated with the inbound message for which the alerting message is sent to the receiver mobile communication device 306.

As another example, The GSM protocol can initiate a voice call from a sender mobile communication device 304 via a setup message. (see e.g. section 9.3.23 of the European Telecommunications Standard, cited above). The eighth bit of the repeat indicator field of such a setup message is unused and can be used consistent with implementations of the current subject matter to serve as the identifier data packet.

Other mobile communication device communication protocols can include similar available locations within exchanged data packages. One or more of these available locations can be leveraged for use as the identifier data packet as discussed above. In these manners or in similar approaches, the alerting message or other call initiation data exchange mechanism can serve as the aforementioned second communication layer consistent with implementations of the current subject matter.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:
   receiving, by a mobile communication device, an inbound message to the mobile communication device, the inbound message being received via a first communication layer;
   determining, by the mobile communication device, whether an identifier data packet associated with the inbound message has been received via a second communication layer that differs from the first communication layer;
   recognizing, by the mobile communication device, a level of elevated prioritization associated with the inbound message based on the determining; and
   providing, by the mobile communication device, a notification of the inbound message based at least in part on the recognized level of elevated prioritization.

2. A computer program product as in claim 1, wherein the identifier data packet comprises information about a priority level associated with content of the inbound message, and wherein the identifier data packet is received from a sender mobile communication device.

3. A computer program product as in claim 1, wherein the first communication layer comprises a voice channel of the mobile communication device.

4. A computer program product as in claim 1, wherein the second communication layer comprises at least one of an Short Message Service ("SMS") SMS layer, a data link layer, and a data communication protocol layer used by the mobile communication device.

5. A computer program product as in claim 1, wherein the identifier data packet comprises an indication that the inbound message has the associated level of prioritization, and the associated level of prioritization is selected from a plurality of levels of prioritization.

6. A computer program product as in claim 1, wherein receipt of the identifier data packet indicates that the inbound message has an elevated level of prioritization and lack of receipt of the identifier data packet indicates that the inbound message does not have an elevated level of prioritization.

7. A system comprising:
   computer hardware configured to perform operations comprising:
   receiving, by a mobile communication device, an inbound message to the mobile communication device, the inbound message being received via a first communication layer;
   determining, by the mobile communication device, whether an identifier data packet associated with the inbound message has been received via a second communication layer that differs from the first communication layer;

recognizing, by the mobile communication device, a level of elevated prioritization associated with the inbound message based on the determining; and providing, by the mobile communication device, a notification of the inbound message based at least in part on the recognized level of elevated prioritization.

8. A system as in claim 7, wherein the identifier data packet comprises information about a priority level associated with content of the inbound message, and wherein the identifier data packet is received from a sender mobile communication device.

9. A system as in claim 7, wherein the first communication layer comprises a voice channel of the mobile communication device.

10. A system as in claim 7, wherein the second communication layer comprises at least one of an Short Message Service ("SMS") SMS layer, a data link layer, and a data communication protocol layer used by the mobile communication device.

11. A system as in claim 7, wherein the identifier data packet comprises an indication that the inbound message has the associated level of prioritization, and the associated level of prioritization is selected from a plurality of levels of prioritization.

12. A system as in claim 7, wherein receipt of the identifier data packet indicates that the inbound message has an elevated level of prioritization and lack of receipt of the identifier data packet indicates that the inbound message does not have an elevated level of prioritization.

13. A computer-implemented method comprising:

receiving, by a mobile communication device, an inbound message to the mobile communication device, the inbound message being received via a first communication layer;

determining, by the mobile communication device, whether an identifier data packet associated with the inbound message has been received via a second communication layer that differs from the first communication layer;

recognizing, by the mobile communication device, a level of elevated prioritization associated with the inbound message based on the determining; and providing, by the mobile communication device, a notification of the inbound message based at least in part on the recognized level of elevated prioritization.

14. A computer-implemented method as in claim 13, wherein the identifier data packet comprises information about a priority level associated with content of the inbound message, and wherein the identifier data packet is received from a sender mobile communication device.

15. A computer-implemented method as in claim 13, wherein the first communication layer comprises a voice channel of the mobile communication device.

16. A computer-implemented method as in claim 13, wherein the second communication layer comprises at least one of an Short Message Service ("SMS") SMS layer, a data link layer, and a data communication protocol layer used by the mobile communication device.

17. A computer-implemented method as in claim 13, wherein the identifier data packet comprises an indication that the inbound message has the associated level of prioritization, and the associated level of prioritization is selected from a plurality of levels of prioritization.

18. A computer-implemented method as in claim 13, wherein receipt of the identifier data packet indicates that the inbound message has an elevated level of prioritization and lack of receipt of the identifier data packet indicates that the inbound message does not have an elevated level of prioritization.

19. A computer-implemented method as in claim 13, wherein at least one of the receiving, the determining, the recognizing, and the providing is performed by at least one programmable processor.

20. A system as in claim 7, wherein the computer hardware comprises a programmable processor and a non-transitory machine-readable medium storing instructions that, when executed by the programmable processor, cause the programmable processor to perform at least some of the operations.

* * * * *